United States Patent [19]
Anderson et al.

[11] Patent Number: 5,483,870
[45] Date of Patent: Jan. 16, 1996

[54] COUNTERTOP CITRUS JUICER

[76] Inventors: David N. Anderson, 2129 Kirkland Lake Dr., Auburndale, Fla. 33823; Wayne C. Sherman, 4702 Joyce Ave., Lakeland, Fla. 33805

[21] Appl. No.: 440,178

[22] Filed: May 12, 1995

[51] Int. Cl.⁶ .............................. A23N 1/02; B30B 9/02
[52] U.S. Cl. .......................... 99/510; 99/495; 100/98 R; 100/108; 100/213
[58] Field of Search .............................. 99/495, 509, 510, 99/513; 100/37, 98 R, 104, 108, 115, 130, 125, 213, 245, 265

[56] References Cited

U.S. PATENT DOCUMENTS

| | | | |
|---|---|---|---|
| 3,236,175 | 2/1966 | Belk | 100/213 |
| 3,429,257 | 2/1969 | Belk | 100/213 |
| 3,736,865 | 6/1973 | Hait | 99/513 |
| 4,300,449 | 11/1981 | Segredo | 99/496 |
| 4,309,943 | 1/1982 | Larsen et al. | 99/509 |
| 4,376,409 | 3/1983 | Belk | 99/509 |
| 4,700,620 | 10/1987 | Cross | 99/510 |
| 4,905,586 | 3/1990 | Anderson et al. | 99/510 |
| 4,922,813 | 5/1990 | Compri | 99/510 |
| 4,922,814 | 5/1990 | Anderson et al. | 99/510 |
| 5,070,778 | 12/1991 | Cross et al. | 99/510 |
| 5,339,729 | 8/1994 | Anderson | 99/495 |

*Primary Examiner*—Timothy F. Simone

[57] ABSTRACT

Latching elements are positioned to interface with removable components of a single head juice extractor. The latching elements are spring clips for holding an upper cup, a lower cup and an orifice tube in place during machine operation. The latching elements are designed to restrain the orifice tube of the juice extractor in situations where initial installation of the parts are imprecise.

19 Claims, 3 Drawing Sheets

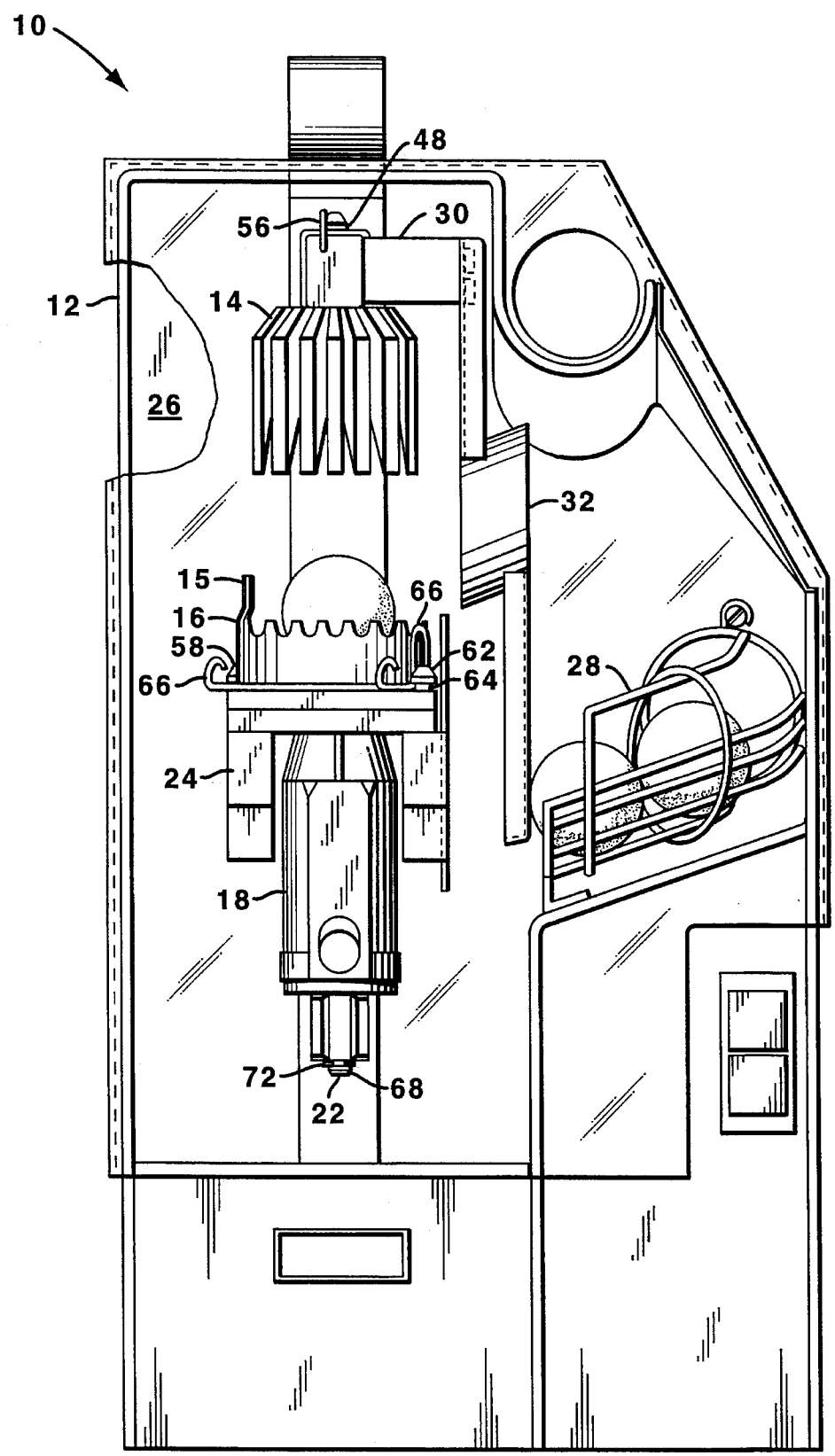
FIG_1

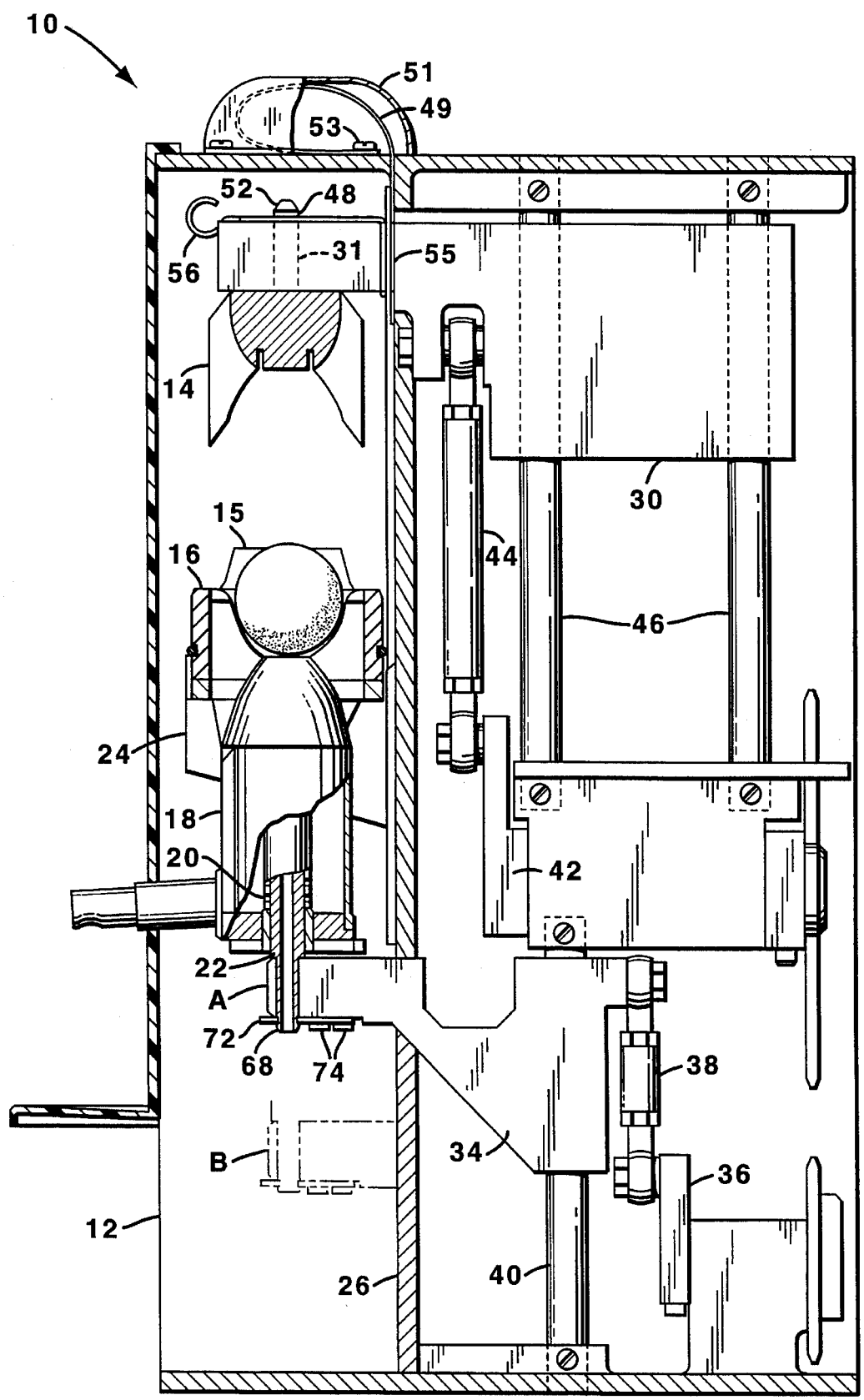
FIG_2

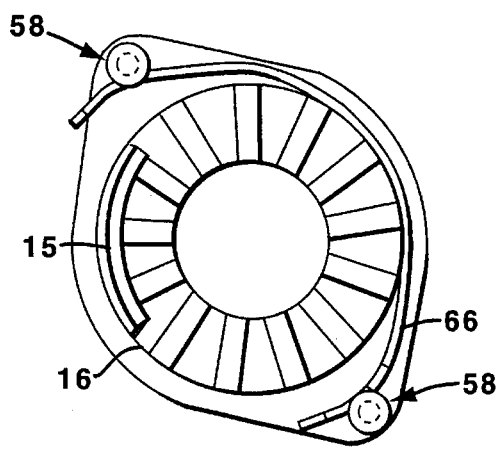
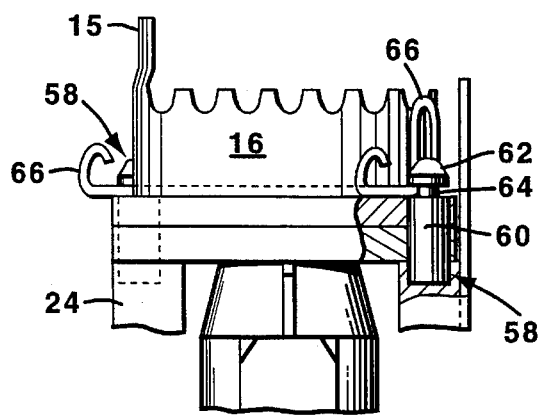
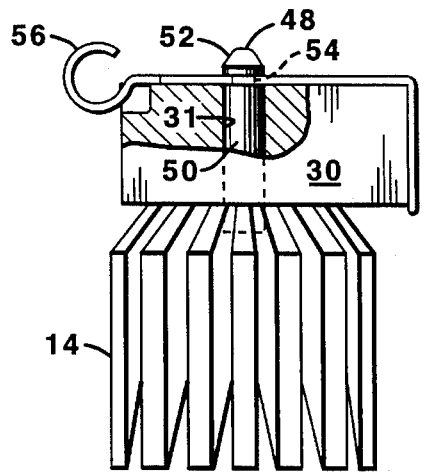
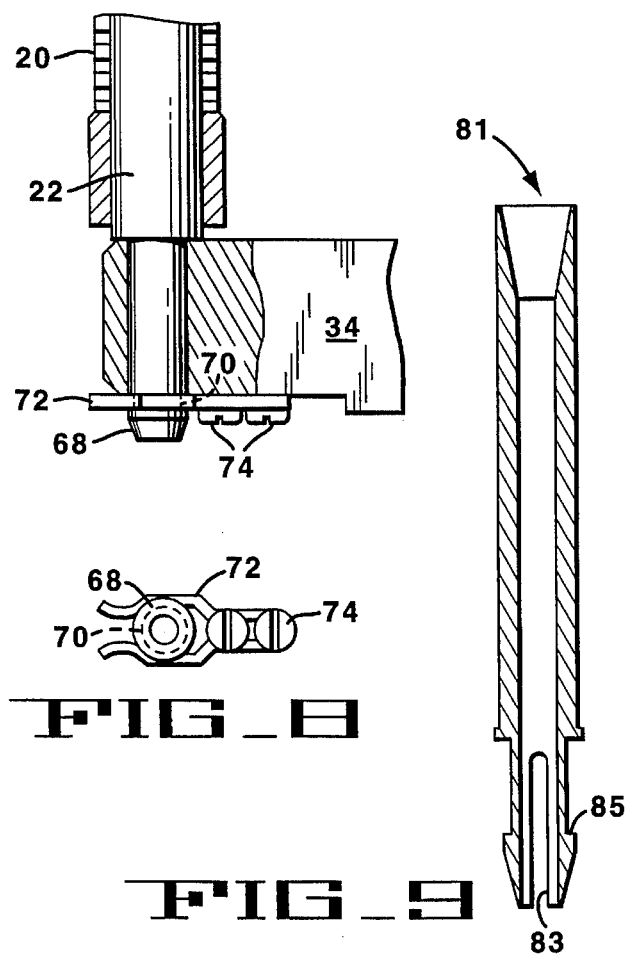
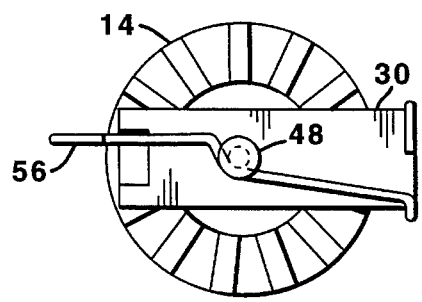

COUNTERTOP CITRUS JUICER

BACKGROUND OF THE INVENTION

This invention has to do with apparatus designed to extract juice from fruit in a light commercial food service environment such as in a grocery store, restaurant, or "fast food" establishment. The primary use is contemplated for use in juicing citrus fruit such as oranges and tangerines.

Juice extractors of the type described herein are often put in use in food service operations where a number of employees have access to and are responsible for operating the juice extractor as well as servicing the extractor. Servicing will include the cleaning of the extractor and will entail the assembly of the extractor after it has been cleaned, sometimes by a person that did not disassemble the juice extractor in the cleaning stage. Assembly is critical in the operation of the extractor as it has been found that in the use of previous extractors the disassembly of an extractor could lead to sever damage to some of the extractor components. This invention is designed to make the assembly and disassembly of the juice extractor easier on the operator and as mistake proof on reassembly as is possible. A fail-safe, easy to assemble juice extractor would be of great value to the industry in as much as it would eliminate some of the equipment replacement costs seen by the point of sale juice processing vendors.

There are several patents that show and explain single head juice extractors of the type disclosed herein. For instance, U.S. Pat. Nos. 4,922,814; 4,905,586 and 5,339,729; issued to the same assignee as this invention is assigned illustrate the type of point-of-sale juice extractors involved herewith. Reference to these patents may enhance the understanding of this invention but clearly are devoid of the features of the invention disclosed herein.

The invention herein is a single head juice extractor that is provided with latching means in three separate areas. A latching means is provided to hold the upper cup to an upper cup drive arm. As second latching means is provided to hold a stationary or lower cup to a fixed support structure in the path of the upper cap. A third and final latching means is used to restrain an orifice robe in relation to its host orifice tube drive arm. Ideally all three of these latching means will be incorporated into the machine, however, a single head juice extractor incorporating less than all three latching means is contemplated.

The provision of these latching means, relying on the use spring clips interfacing with indentations or grooves on various parts, enables the single head juice extractor to be disassembled for cleaning without tools and then subsequently reassembled, again without tools, in a manner that will accommodate at least a degree of misalignment or incomplete assembly when the parts are put back into the juice extractor.

In the environment where this type of single head juice extractor is being used there is an expectation that the juice contacting components will be cleaned on a frequent basis. Cleaning of the components can be enhanced if these components, such as the upper and lower cups and the orifice tube, for instance, can be easily removed and replaced. The use of tools, wrenches, screwdrivers, bars, etc. can slow down the work and increase the chance that parts will be damaged or will be improperly reassembled. As stated above, the latching elements of this invention preclude the need for tools in the performance of routine cleaning functions.

One advantage of the invention herein has to do with the fact that an amount of misassembly after cleaning can be tolerated by the structure. In previous structures, it was important that the removable components be properly positioned and anchored before the single head juice extractor was restarted after cleaning. Failure to have the components properly mounted could result in a machine jam or lockup on startup. For instance, the invention presented herein includes an orifice tube with a conical end. This conical end provides a ramp surface for a spring pin to ride before the spring pin latches home with a groove in the proximate end of the orifice tube. Thus even if the orifice tube is not fully and correctly positioned, it will be driven, during the normal machine cycle, into proper engagement with the spring clip latch means.

Another advantage of this invention is that not only are tools eliminated but various fasteners, washers, and parts or the like are eliminated. In prior art structures there were small parts that could be dropped and lost or simply more easily worn out. The cost of providing such tools and fasteners has been taken out of the invention provided herein.

One further advantage of the invention is the speed of disassembly and assembly is enhanced due again to the reduction in the number of parts and tools involved and the ease of attachment provided by the spring clips.

These and other advantages and savings will be apparent to the reader of this disclosure when it is read in conjunction with a perusal of the drawing figures.

BRIEF DESCRIPTION OF THE DRAWING FIGURES

The invention is shown in the attached drawing figures wherein:

FIG. 1 is a partially sectioned front elevation view of the invention;

FIG. 2 is a partially sectioned side elevation view of the invention;

FIG. 3 is a top view of the lower cup of the invention on a portion of the single head juice extractor;

FIG. 4 is a partially sectioned side elevation view of the lower cup of the invention on a portion of the single head juice extractor;

FIG. 5 is a presentation of an upper cup mounted on a partially sectioned portion of the single head juice extractor;

FIG. 6 is a top view of the upper cup and a portion of its support structure;

FIG. 7 is a portion of the partially sectioned orifice tube and the portion of the single head juice extractor to which it is attached;

FIG. 8 is a bottom view of the apparatus shown in FIG. 7;

FIG. 9 is an alternative orifice tube latching means.

DETAILED DESCRIPTION OF THE INVENTION

The overall representation of the invention can best be appreciated in FIG. 1 and FIG. 2. In these and all the other figures, like reference numbers indicated like parts.

The single head juice extractor, generally 10, includes a housing 12 that will contain and support the operative equipment necessary to extract juice from fruit. Of critical importance to this invention is the upper cup, the lower cup 16 and on orifice tube 22 carried for reciprocal movement inside a strainer tube 20 which resides in a juice collecting sump 18. A mounting plate 24 provides a platform for the lower cup 16 and support means for the juice collecting sump 18. The mounting plate is fixedly attached to an internal wall 26 of the housing 12.

Fruit, such as the representation of oranges shown, are staged in a feed chute 28. As explained in earlier patents and as general background for this disclosure, fruit will be carried by a fruit elevator to a fruit bridge 32 from whence the fruit will tumble into the stationary lower cup 16 county as shown in FIGS. 1 and 2.

As earlier stated, the invention herein pertains to means for restraining the lower cup 16, the upper cup 14 and the orifice tube 22. Looking first at FIGS. 3 and 4, the restraint or latching means holding the lower cup 16 to the mounting plate 24 will be explained. The lower cup 16 is provided with a base portion that supports a plurality of interdigitating fingers that will interdigitate with the fingers of the upper cup 14. The base portion is provided with at least a single through aperture, typically unthreaded, for accepting a lower cup retainer guide pin 58, in a preferred embodiment a pair of such pins are used, which is carded in the mounting plate 24. The body portion 60 of the guide pin has a diameter dimensionally close to but slightly smaller than the aperture in the mounting plate 24. Additionally, the lower cup retainer guide pin 58 has a tapered surface 62 at the upwardly extending end of the pin. This tapered surface 62 is separated from the main body of the guide pin by an indentation or groove 64 machined or otherwise formed in the lower cup retainer guide pin. This groove 64 will accommodate a lower cup spring clip 58. The lower cup spring clip 58 partially circumvents the lower at the junction of the base of the lower cup and the interdigitating finger portion of the lower cup. One end of the spring clip will interface, meaning "reside in" the groove 60 of the lower cup retainer guide pin 58. The spring clip will then extend to and engage the groove 64 in the second lower cup retainer guide pin also 58. With both pins engaging the spring clip 66 and the spring clip engaging the lower cup, the spring tension of the spring clip will keep the spring clip engaged.

An upwardly extending section 65 of the spring clip will enhance handling—removing and reinstalling the spring clip—by providing a "compression" relaxor to assist in spring clip removal.

Removal, of course, of the lower cup 16 will entail compressing the spring clip 66 by means of the upwardly extending section 65 to disengage the spring clip from the groove 64. The other end of the spring clip will then easily slip out of engagement with the groove of the second lower cup retainer guide pin (if one is provided).

The lower cup is also provided with a lip 15 extending up from the major portion of the lower cup. The lip 15 acts as a fruit stop or fruit dam that prevents the fruit from tumbling out of the cup when the fruit is dropped from the fruit bridge 32 into the cup. The cup in this preferred embodiment doesn't have the long vertical fingers of prior art lower cups, thus there has been found a need to include the lip 15 on the generally shorter lower fruit cups used in these point of sale juice extractors.

The upper cup 14 is carried on an upper cup drive arm 30 which is mounted for reciprocal motion and is driven by means of an upper cup drive eccentric 42 by means of upper cup drive link 44. The upper cup drive eccentric 42 is driven off a driven shaft as explained in the prior art similar structures.

The upper cup drive arm 30 is provided with an aperture, in a preferred embodiment a through aperture such as 31. The aperture 31 will receive the upper cup retainer guide pin 48 which will pass through the aperture. It is contemplated that the upper cup retainer guide pin 48 is formed as part of or is fixedly attached to the top of the upper cup 14.

The upper cup 14 uses a spring clip 56 interfacing with an indentation or groove 54 formed in the upper cup retainer guide pin 48 to hold the upper cup 14 in close contact with the upper cup drive arm 30. The spring clip 56 is mounted the upper cup drive arm 30 in such a way that it will transverse the aperture 31 when the spring clip is in a relaxed state. With the upper cup retainer guide pin 48 in the aperture the spring clip will be urged and put in tension through its contact with the guide pin 48. This type of attachment is sometimes referred to as a "bayonet" attachment-which is known in some fields but has not been used in single head juice extractors.

Reassembly has been referred to earlier. It can be seen that if the upper cup 14 is not fully "home" against the upper cup drive arm the coupling of the machine will force the upper cup retainer guide pin 48 to enter fully through the aperture of the upper cup drive arm 30 when the first orange is processed. The tapered surface 52 of the retainer guide pin will contact the upper cup spring clip and urge it laterally off the aperture to allow passage of the upper cup retainer guide pin 48. When the pin and upper cup 14 are "home" the spring clip section adjacent the pin will snap in the groove 54 in the retainer guide pin.

In FIG. 2, an element of the invention not having to do with the latching means used to hold components in the juice extractor, but contributing to the desirability and functionality of the unit, is shown. This is the slot cover 49 carried in the cover 51 and attached at one end thereof by fasteners 53 to the top of the housing of the point of sale juice extractor. This slot cover 49 or curtain is attached at its second end 55 to the upper cup drive arm 30. As the upper cup drive arm 30 is cycled downwardly through the slot in the wall 26 the slot cover 49 will be dragged along with the upper cup drive arm as it progresses downwardly toward the lower cup. The slot cover will enter the juice extractor through an aperture in the top of the housing. The slot cover is expected to be a pliable plastic material that will cycle many times into and out of the cover 51. About seven inches of travel of the upper cup drive arm (one way) is the normal stroke of the machine, thus about seven inches of pliable plastic slot cover will be accommodated in the cover 51. Length is an obvious function of machine stroke.

The retention of the orifice tube 22 is similar to the bayonet attachment used for the upper cup restraint. The orifice tube 22 is a sliding fit inside the strainer robe 20 and will cycle up and down therethrough, roughly from position A to phantom position B by means of its association with the reciprocating orifice tube drive arm 34 which, guided on bearing column 40, is driven by orifice tube crank arm 36 through orifice tube drive link 38 as in explained in the prior art.

The orifice tube 22 has a conical end 68 that will allow it to ramp up or along the orifice tube spring clip 72. Inboard of the conical end 68 of the orifice tube is a groove in the end portion of the orifice tube. This groove or indentation will interface with the orifice tube spring pin 72 which may be and will in a preferred embodiment be different in shape than the upper cup spring clip and the fixed lower cup spring clip. The orifice tube spring clip may be held to the orifice tube drive arm 34 by means of spring clip retainers such as 74.

The spring clip 72, shown in FIG. 7, used to hold the orifice tube to the lower arm is shown more clearly in FIG. 8. This figure shows the bottom view of FIG. 7 with the conical surface 78 of the orifice tube shown latched in place by means of the clip 72.

One alternative embodiment of this latching means is shown in FIG. 9. In this view, the orifice tube 81 has been provided with several vertical grooves 83 extending into the hollow interior of the orifice tube. These grooves allow for the expansion latching of the orifice tube, whose end is now flexibly deformable inwardly to the orifice tube drive arm. Additionally a small lip 85 is formed toward or proximate to the conical or ramped end of the orifice tube. This lip will engage the bottom side of the orifice tube drive arm and retain the orifice tube to the drive arm. The orifice tube is inserted onto the aperture of the orifice tube drive arm but is retained there by expansion of the end of the orifice tube rather than by the clip 72 as shown in FIG. 7.

In operation, assuming the orifice tube has been removed for cleaning, when it is reinstalled it will be directed into and through a through aperture in the orifice tube drive arm 34. Proper installation would entail seating the orifice tube solidly on the drive arm so that the orifice tube groove 70 would be captured by the orifice tube spring 72. If, however, the orifice tube is not solidly seated, the conical end on the orifice tube will spread or displace the spring clip—which would traverse at least a portion of the aperture in the orifice tube drive arm—and allow the orifice tube to latch in place. It may be necessary that the juice extractor is cycled to seat the orifice tube but the equipment is designed so that cycling the machine will seat the orifice tube rather than bind up or lock up the machine.

The structure shown in the drawing figures sets forth the preferred embodiment of the invention and although this specification attempts to identify parts and part relationships the drawings may be the best teaching.

The following claims attempt to reserve for the inventors all rights in the invention presented herein to the extent possible under the law. Nuances of design that don't depart from the spirit and broad scope of these claims are considered to be covered by them.

What is claimed is:

1. A single head juice extractor having a housing defining an orifice robe drive arm slot and further comprising a lower cup and an interdigitating upper cup mounted on an upper cup drive arm, an orifice robe mounted through an aperture defining orifice tube drive arm, said orifice tube carried inside a strainer tube for reciprocal movement therein, the improvement comprising:

means for mounting said upper cup to said upper cup drive arm by means of an upper cup spring clip biased to contact said upper cup for holding said upper cup to said upper cup drive arm;

means for mounting said orifice tube through said aperture of said orifice drive arm by means of an orifice tube restraining means for holding said orifice tube to said orifice robe drive arm.

2. The invention in accordance with claim 1, wherein said orifice tube restraining means includes a spring clip.

3. The invention in accordance with claim 2, wherein said orifice robe includes an end portion having a conical end, said end portion further including an indentation for receiving said orifice robe restraining spring clip.

4. The invention in accordance with claim 3, wherein said orifice tube aperture is at least partially traversed by said orifice tube restraining spring clip when said orifice tube is not inserted in said aperture of said orifice tube drive arm.

5. The invention in accordance with claim 4, wherein said orifice tube restraining spring clip will be displaced from partially traversing said through aperture when said orifice tube is being inserted in said through aperture and will be replaced to a position partially traversing said through aperture when said orifice tube is completely inserted in said through aperture.

6. The invention in accordance with claim 5, wherein said indentation for receiving said orifice tube restraining spring clip may dimensionally accommodate said orifice tube restraining spring clip.

7. The invention in accordance with claim 6, wherein said indentation for receiving said orifice tube restraining spring clip is a groove formed in said end portion of said orifice tube.

8. The invention in accordance with claim 2 wherein said orifice tube includes an end portion having a conical end, said end portion being flexibly deformable inwardly and further including a small lip formed proximate said conical end portion of said orifice tube.

9. The invention in accordance with claim 8 Wherein said orifice tube flexibly deformable end portion is inserted into said aperture of said orifice tube drive arm.

10. The invention in accordance with claim 1, wherein said upper cup includes an upper cup retainer guide pin means and said upper cup drive arm includes an aperture for receiving said upper cup retainer guide pin means.

11. The invention in accordance with claim 10, wherein said aperture of said upper cup drive arm is a through aperture.

12. The invention in accordance with claim 11, wherein said upper cup spring clip traverses said aperture of said upper cup drive arm.

13. The invention in accordance with claim 12, wherein said upper cup spring clip will be displaced from traversing said aperture of said upper cup drive arm when said upper cup retainer guide pin means is inserted in said aperture of said upper cup drive arm and will be replaced to a position traversing said aperture of said upper cup drive arm when said upper cup retainer guide pin means is substantially through said aperture of said upper cup drive arm.

14. The invention in accordance with claim 13, wherein said upper cup retainer guide pin is provided with an indentation for receiving said upper cup spring clip.

15. The invention in accordance with claim 14, wherein said indentation for receiving said upper cup spring clip is a groove formed in an upper portion of said upper cup retainer guide pin.

16. The invention in accordance to claim 1, wherein said lower cup is removably retained to said single head juice extractor in the path of said upper cup such that said interdigitating upper cup will interdigitate with said lower cup.

17. The invention is accordance with claim 16, wherein said lower cup is provided with at least a single unthreaded aperture therethrough.

18. The invention in accordance with claim 17, wherein said restraint of said lower cup to said single head juice extractor is accomplished by means of at least a single guide pin fixedly attached to said single head juice extractor which is passed through said aperture of said lower cup and further includes lower cup spring means for contacting said lower cup and said guide pin simultaneously.

19. The invention in accordance with claim 18, wherein said guide pin is formed with an indentation for receiving said lower cup spring means.

\* \* \* \* \*